United States Patent
Park

(10) Patent No.: US 7,979,099 B2
(45) Date of Patent: Jul. 12, 2011

(54) SLIDE MODULE AND MOBILE TERMINAL INCORPORATING THE SLIDE MODULE

(75) Inventor: Hyo-Sung Park, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 483 days.

(21) Appl. No.: 11/552,101

(22) Filed: Oct. 23, 2006

(65) Prior Publication Data

US 2007/0099453 A1    May 3, 2007

(30) Foreign Application Priority Data

Oct. 21, 2005 (KR) .................. 10-2005-0099879

(51) Int. Cl.
*H04M 1/00* (2006.01)
*H05K 5/00* (2006.01)
*H05K 7/00* (2006.01)
*G06F 1/16* (2006.01)

(52) U.S. Cl. ............. 455/575.4; 455/575.1; 455/575.3; 361/679.02; 361/679.27; 361/679.3

(58) Field of Classification Search ............. 455/575.1, 455/575.3, 575.4, 575.8, 550.1, 403, 556.1, 455/556.2; 16/341, 367; 361/814, 679.01–679.3; 345/156, 158, 168, 169

See application file for complete search history.

(56) References Cited

U.S. PATENT DOCUMENTS

| | | | | |
|---|---|---|---|---|
| 6,011,699 | A * | 1/2000 | Murray et al. | 361/814 |
| 6,149,442 | A * | 11/2000 | Enright | 439/31 |
| 6,175,990 | B1 | 1/2001 | Kato et al. | |
| 6,766,181 | B1 * | 7/2004 | Newman et al. | 455/575.3 |
| 6,999,803 | B2 * | 2/2006 | Jung | 455/575.3 |
| 7,003,104 | B2 * | 2/2006 | Lee | 379/433.13 |
| 7,168,135 | B2 * | 1/2007 | Jung et al. | 16/367 |
| 2002/0128053 | A1 * | 9/2002 | Jung | 455/575 |
| 2004/0137940 | A1 * | 7/2004 | Matsunami | 455/550.1 |
| 2005/0198779 | A1 * | 9/2005 | Jung et al. | 16/367 |
| 2005/0221873 | A1 * | 10/2005 | Kameyama et al. | 455/575.4 |
| 2005/0266897 | A1 * | 12/2005 | Ahn et al. | 455/575.1 |
| 2006/0154702 | A1 * | 7/2006 | Kang et al. | 455/575.3 |
| 2008/0004083 | A1 * | 1/2008 | Ohki et al. | 455/566 |
| 2009/0036177 | A1 * | 2/2009 | Lee et al. | 455/575.3 |

FOREIGN PATENT DOCUMENTS

| | | |
|---|---|---|
| KR | 10-2006-0032874 A | 4/2006 |
| WO | 01/84729 | 11/2001 |
| WO | 2004/021681 | 3/2004 |
| WO | 2006/075871 | 7/2006 |

* cited by examiner

*Primary Examiner* — George Eng
*Assistant Examiner* — Bryan Pitt
(74) *Attorney, Agent, or Firm* — Lee, Hong, Degerman, Kang & Waimey

(57) ABSTRACT

A mobile terminal is provided that can satisfy various functions. The mobile terminal includes a first body, a second body mounted to the first body such that the second body can be opened and closed and a slide module is mounted between the first and second bodies, thereby enabling the first body to slidably move in one direction and fold in a different direction.

15 Claims, 7 Drawing Sheets

SLIDE MODULE AND MOBILE TERMINAL INCORPORATING THE SLIDE MODULE

CROSS-REFERENCE TO RELATED APPLICATIONS

Pursuant to 35 U.S.C. §119(a), this application claims the benefit of earlier filing date and right of priority to Korean Application No. 99879/2005, filed on Oct. 21, 2005, the contents of which are hereby incorporated by reference herein in their entirety.

FIELD OF THE INVENTION

The present invention relates to a mobile terminal having a slide module and, more particularly, to a slide module slidably movable in one direction and foldable in a different direction and a mobile terminal incorporating the slide module.

DESCRIPTION OF THE RELATED ART

FIG. 1 is a perspective view of a slide-type mobile terminal 1 according to the related art. As illustrated in FIG. 1, the related art slide-type mobile terminal 1 includes a display unit 10 having a display 12 for visually displaying various information; a terminal body 20 slidably mounted to the display unit 10 and having a keypad 22 for entering information; a battery 28; and a slide module (not shown) installed between the display unit and the terminal body to enable the display unit to slidably move relative to the terminal body.

When the display unit 10 is slidably moved in a lengthwise direction, the mobile terminal 1 is opened and when the display unit 10 is slidably moved in the opposite direction, the mobile terminal is closed. When the mobile terminal 1 is opened, the keypad 22 installed on the terminal body 20 is exposed to allow a user to enter information.

However, since the related art slide-type mobile terminal 1 is opened by slidably moving the display unit 12 in only the lengthwise direction, various functions are not satisfied.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An object of the present invention is to provide a slide module capable of being slidably moved in a vertical (up and down) direction and folded in a horizontal (left and right) direction, thereby satisfying various functions. Another object of the present invention is to provide a mobile terminal incorporating the slide module.

In one aspect of the present invention, a mobile terminal is provided. The mobile terminal includes a first body, a second body mounted to the first body such that the second body can be opened and closed relative to the first body and a slide module mounted between the first body and second body and adapted to enable the first body to slidably move in a first direction and to fold in a second direction, wherein the first direction and the second direction are different.

It is contemplated that the first body includes a first display located on a front surface, a second display mounted on a rear surface and a pair of speakers mounted on opposite sides of the rear surface. It is further contemplated that the terminal further includes a hinge connection part formed at one side of the first body and wherein the slide module is rotatably mounted to the hinge connection part.

It is contemplated that the second body includes keys mounted on a front surface. It is further contemplated that the slide module includes a hinge member rotatably supported at the first body, a slide member fixed to the hinge member and a slide rail fixed to the second body and movably supporting the slide member.

It is contemplated that the terminal further includes a hinge connection part formed on the first body and wherein the hinge member includes a bar type having two ends, each rotatably mounted to the hinge connection part. It is further contemplated that the terminal further includes a flexible printer circuit (FPC) connected to the first body and wherein the hinge member includes a passage formed in a lengthwise direction and adapted to allow the FPC to pass there through.

It is contemplated that the hinge member further includes a withdrawal hole adapted to allow the FPC to pass there through such that the FPC is connected to the second body. It is further contemplated that the second body further includes an FPC receiving part formed in a lengthwise direction at its side, the FPC receiving part adapted to receive the FPC in an overlap state after the FPC passes through the withdrawal hole.

It is contemplated that the terminal further includes a cam unit mounted between the hinge member and the first body and adapted to provide an elastic force in a direction that the first body is rotated. It is further contemplated that the cam unit includes a housing fixed within the hinge member, a first cam having a first cam face and mounted to be linearly movable within the housing, a second cam rotatably disposed within the housing and having a second cam face adapted to contact the first cam face, a head connected to the second cam and fixed to the first body and a spring disposed within the housing and adapted to provide an elastic force to the first cam.

It is contemplated that the terminal further includes a rail part formed at opposite edges of the slide member and slidably mounted on the slide rail and wherein the hinge member is fixed to a side of the slide member. It is further contemplated that the terminal further includes a guide protrusion formed at opposite edges of the slide rail and wherein the slide rail is adapted to engage an upper surface of the second body and the rail part is inserted into the guide protrusion.

It is contemplated that the slide rail is mounted within the second body such that it supports the slide member. It is further contemplated that the terminal further includes a buffer member installed on an upper surface of the second body, the buffer member adapted to lessen an impact when the first body is folded and to guide the first body when the first body is slidably moved.

It is contemplated that the buffer member protrudes in a lengthwise direction of the second body on the upper surface of the second body. It is further contemplated that the terminal further includes a stopper formed on the second body and adapted to catch the slide member when the slide member is slidably moved. Preferably, the stopper includes a first stopper protruding from an inner side of the second body and adapted to catch the slide member when the slide member is slidably moved in an opening direction and a second stopper adapted to catch the slide member when the slide member is slidably moved in a closing direction.

In another aspect of the present invention, a slide module is provided. That slide module includes a hinge unit rotatably supported at a first body, a slide member adapted to fix the hinge unit and a slide rail fixed at a second body, wherein the slide member is slidably mounted in the slide rail.

It is contemplated that the hinge unit includes a bar type having two ends, each rotatably mounted on the first body. It is further contemplated that the slide further includes a cam unit mounted between the hinge unit and the first body and adapted to provide an elastic force in a direction that the first body is rotated.

It is contemplated that the cam unit includes a housing fixed within the hinge unit, a first cam having a first cam face and mounted to be linearly movable within the housing, a second cam rotatably disposed within the housing and having a second cam face adapted to contact the first cam face, a head connected to the second cam and fixed to the first body and a spring disposed within the housing and adapted to provide an elastic force to the first cam. It is further contemplated that the slide module further includes a rail part formed at opposite edges of the slide member and slidably mounted on the slide rail and wherein the hinge unit is fixed to a side of the slide member. Preferably, the slide module further includes a guide protrusion formed at opposite edges of the slide rail and wherein the slide rail is adapted to engage an upper surface of the second body and the rail part is inserted into the guide protrusion.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
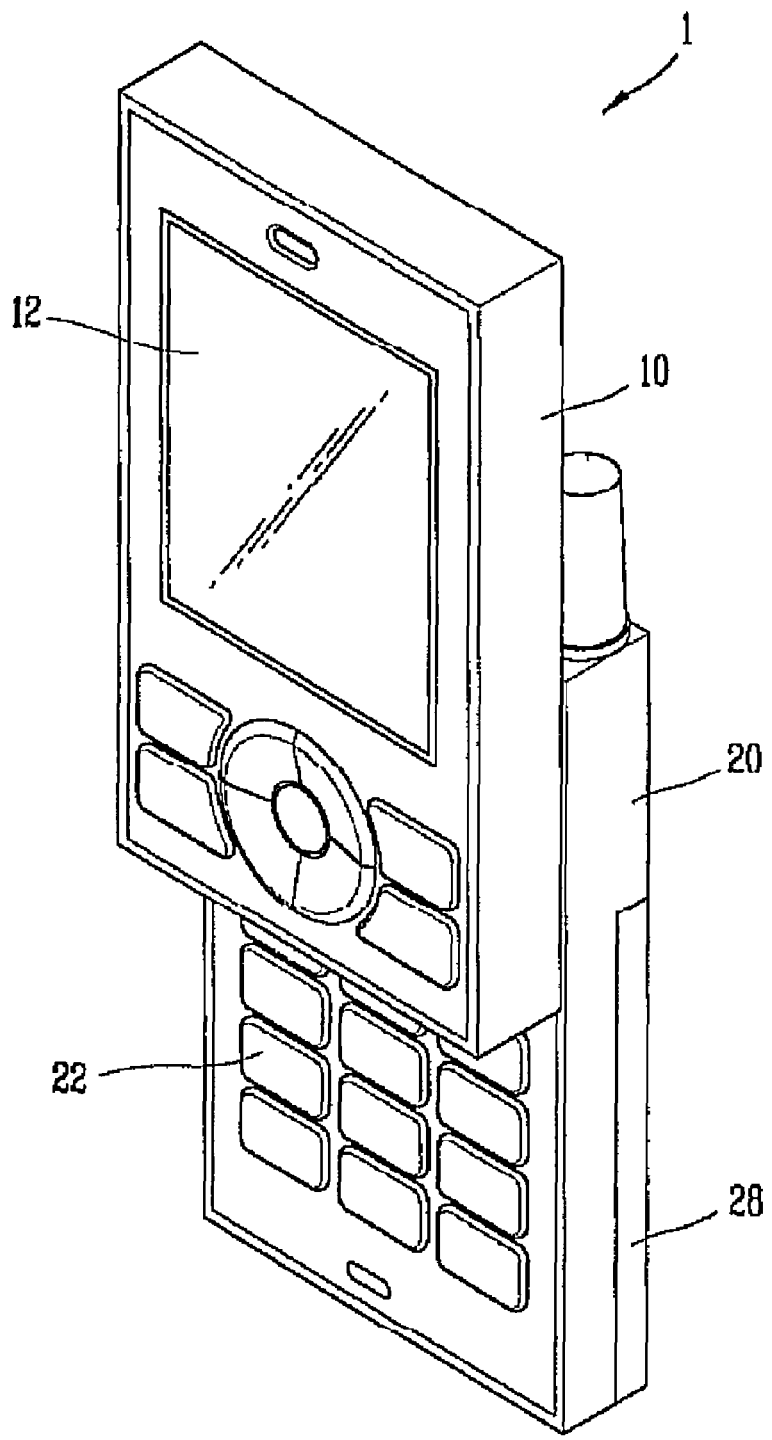
FIG. 1 is a perspective view illustrating a slide type mobile terminal according to the related art.
Figure 2:
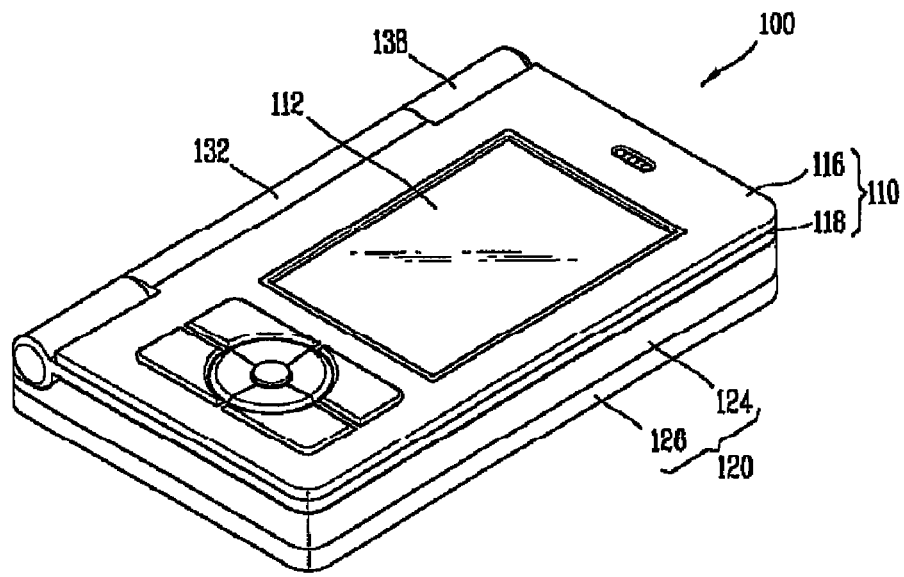
FIG. 2 is a perspective view illustrating a mobile terminal according to the present invention.
Figure 3:
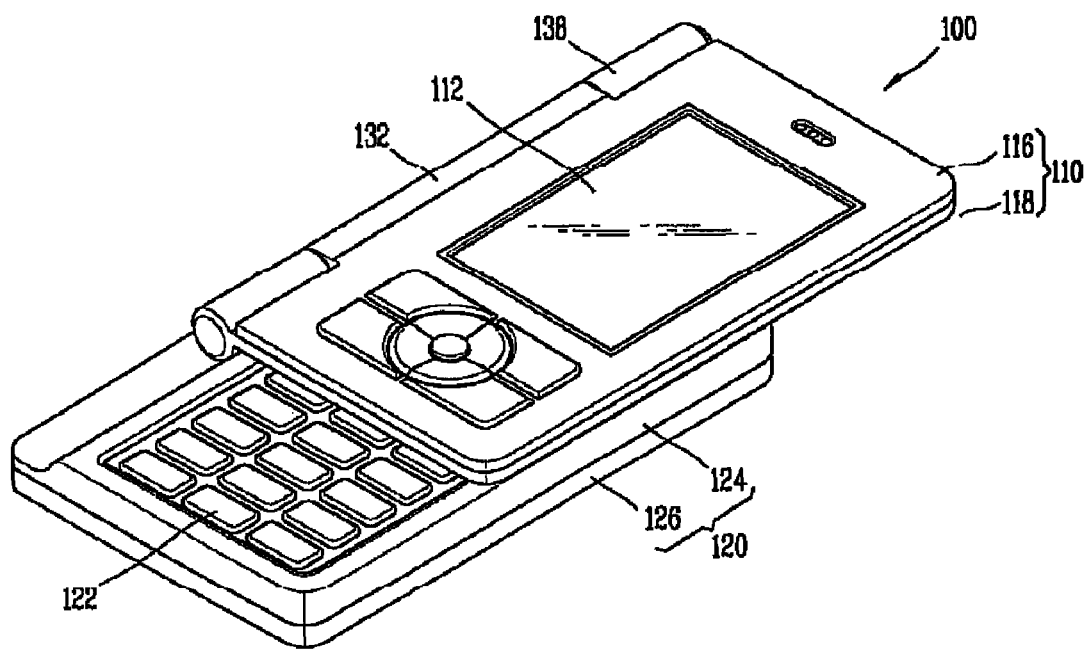
FIG. 3 is a perspective view illustrating a slidably moved state of a mobile terminal according to the present invention.
Figure 4:
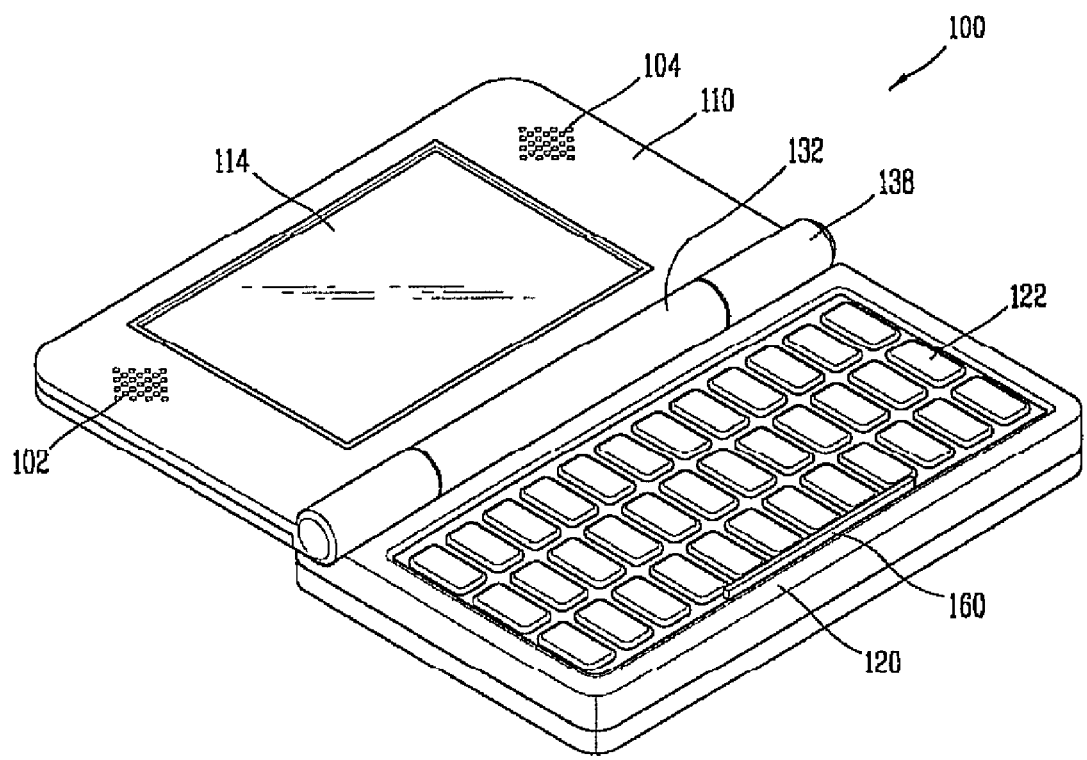
FIG. 4 is a sectional view illustrating a folded state of a folded mobile terminal according to the present invention.
Figure 5:
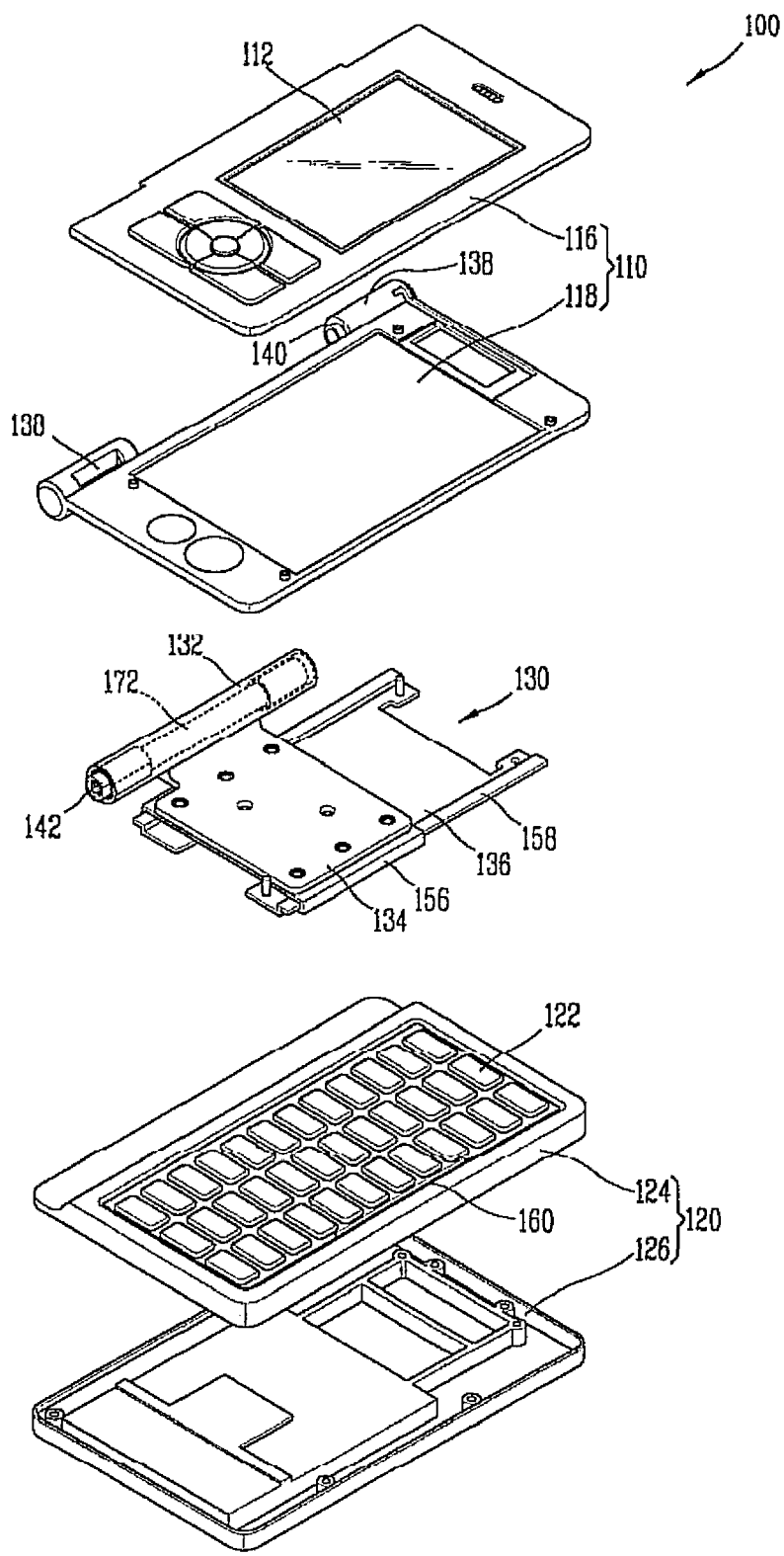
FIG. 5 is an exploded perspective view illustrating the mobile terminal according to the present invention.

FIG. 2 illustrates a mobile terminal 100 according to the present invention. FIG. 3 illustrates a slidably moved state of the mobile terminal 100 and FIG. 4 illustrates a folded state of the mobile terminal. FIG. 5 illustrates various components of the mobile terminal 100.

The mobile terminal 100 includes a first body 110 having displays 112 and 114 for displaying information; a second body 120 having a keypad 122 for entering information; and a slide module 130 installed between the first and second bodies enabling the first body to be slidably moved and folded relative to the second body. The first body 110 includes an upper body 116 with a front display 112 mounted on its front surface and a rear body 118 mounted on the upper body and having a rear display 114 mounted on its rear surface. A pair of speakers 102 and 104 is mounted at both sides of the rear surface of the first body 110 to generate sound.

The second body 120 includes an upper body 124 having the keypad 122 mounted on its front surface and a lower body 126 mounted on the upper body and adapted to receive a battery (not shown).

The slide module 130 includes a hinge member 132 rotatably connected to the first body 110, a slide member 134 to which the hinge member is fixed and a slide rail 136 to which the slide member 134 is mounted such that it is slidably movable. The slide rail is fixed to the second body 120. Preferably, the hinge member 132 is formed as a circular bar-type having an internal space and rotatably mounted to a hinge connection part 138 formed on the lower body 118 of the first body 110.

One end portion of the hinge member 132 is inserted into a hinge protrusion 140 that protrudes from the hinge connection part 138 formed at one side of the lower body 118. A cam unit 142 is mounted between the opposite end portion of the hinge member 132 and the hinge connection part 138 formed at the opposite side of the lower body 118. The cam unit 142 provides elastic force in a direction that the first body 110 is opened and closed when folded.

Figure 6:
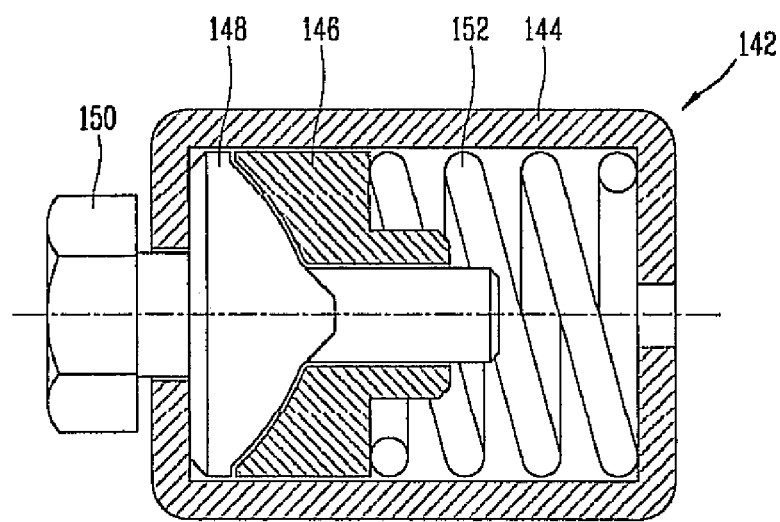
FIG. 6 is a sectional view illustrating a cam unit of a slide module according to the present invention.

As illustrated in FIG. 6, the cam unit 142 includes a housing 144 fixed within the hinge member 132, a first cam 146 mounted such that it is linearly movable within the housing and having a first cam face, a second cam 148 having a second cam face contacting the first cam face and rotatably disposed within the housing, a head 150 connected to the second cam and fixed at the hinge connection part 138, and a spring 152 disposed within the housing and providing elastic force to the first cam. When the first body 110 is rotated in the opening or closing direction, the second cam 148 connected to the head 150 is rotatably moved. Accordingly, the first cam 146 is linearly moved in response to an interaction between the first and second cam faces and, when the first cam passes a dead point, the first body 110 is automatically opened or closed by virtue of the elastic force of the spring 152.

The slide member 134 has a flat plate form and the side of the slide member 134 is integrally formed at the side of the hinge member 132. The slide member 134 is mounted such that it is slidably moved on the slide rail 136. Specifically, a rail part 156 is formed such that it is bent twice at a right angle at both edges of the slide member 134, inserted in the slide rail 136, and slidably moved.

The slide rail 136 is fixed to the second body 120, on which the slide member 134 is slidably disposed and a guide protrusion 158 is formed at both edges of the slide rail in an upwardly protruded form into which the rail part 156 is inserted. Preferably, the slide rail 136 is fixed between the upper body 122 and the lower body 126 such that the slide member 134 is slidably combined with the slide rail.

An elastic force providing unit (not shown) is installed between the slide rail 136 and the slide member 134 in order to provide an elastic force to allow the slide member to be automatically opened or closed when the slide member is pushed, respectively, in the opening or closing direction. The elastic force providing unit can be applied to any structure as long as the slide member 134 is automatically opened by virtue of the elastic force of the spring when the elastic force providing unit pushes the slide member past the dead point.

A buffer member 160 is installed on the upper surface of the second body 120 in order to buffer an impact generated when the first body 110 is folded. The buffer member 160 also serves to guide the first body 110 when the first body is slidably moved. Preferably, the buffer member 160 is made of a rubber material and formed such that it protrudes with a certain height in the lengthwise direction of the second body 120 on the upper surface of the second body.

Figure 7:
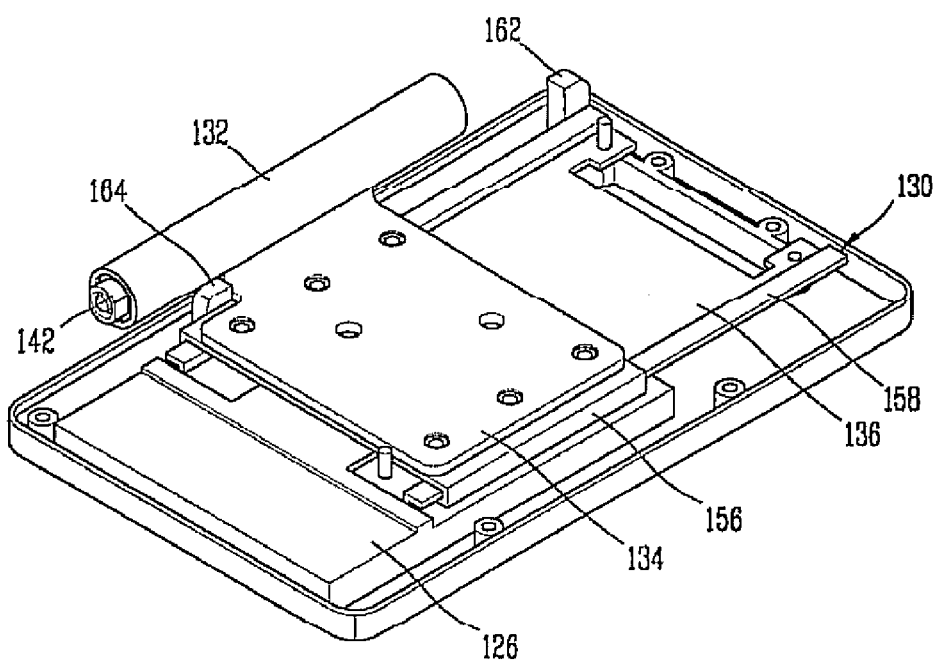
FIG. 7 is a perspective view illustrating one operational state of a slide module mounted in a mobile terminal according to the present invention.
Figure 8:
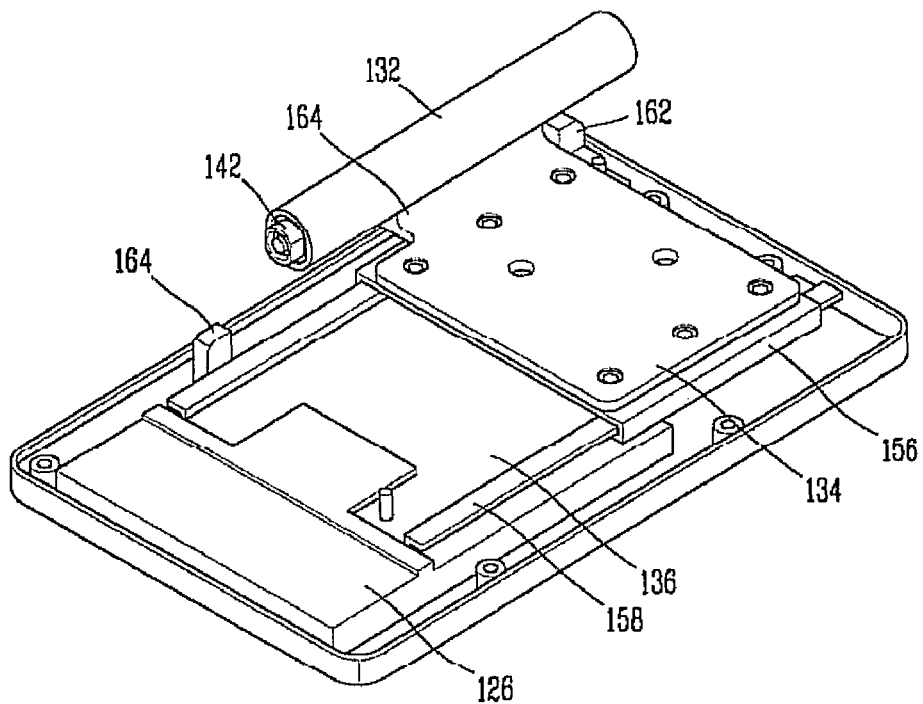
FIG. 8 is a perspective view illustrating another operational state of the slide module of FIG. 7.

FIG. 7 illustrates one operational state of a slide module 130 mounted in the mobile terminal 100 according to the present invention. FIG. 8 illustrates another operational state of the slide module 132.

Stoppers 162 and 164 are formed on the lower body 126 of the second body 120 to limit slidable movement of the first body 110 by catching the slide member 134 when the first body is slidably moved. The stoppers 162 and 164 are formed such that they protrude from the upper surface of the lower body 126 of the second body 120.

When the first body 110 is in an opened state after being slidably moved, the first stopper 162 catches one side of the guide member 134. When the first body 110 is in a closed state after being slidably moved, the second stopper 164 catches the side of the slide member 134.

Figure 9:
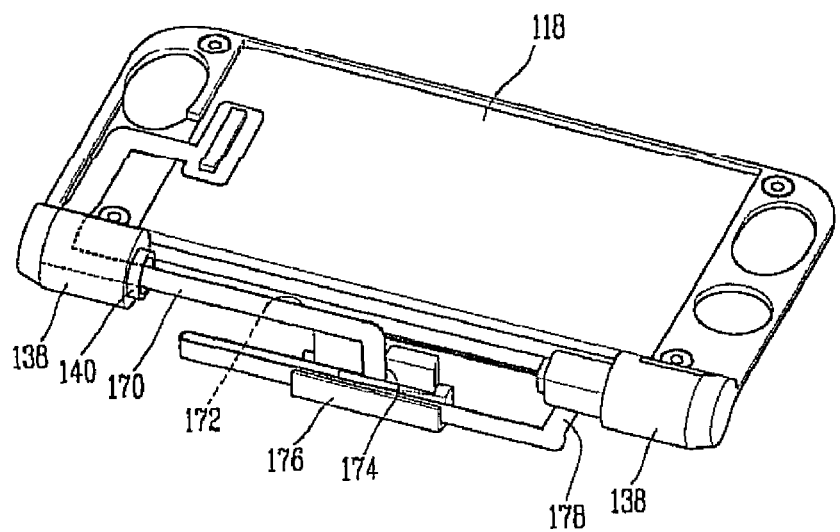
FIG. 9 is a perspective view illustrating an FPC connection structure according to the present invention.
Figure 10:
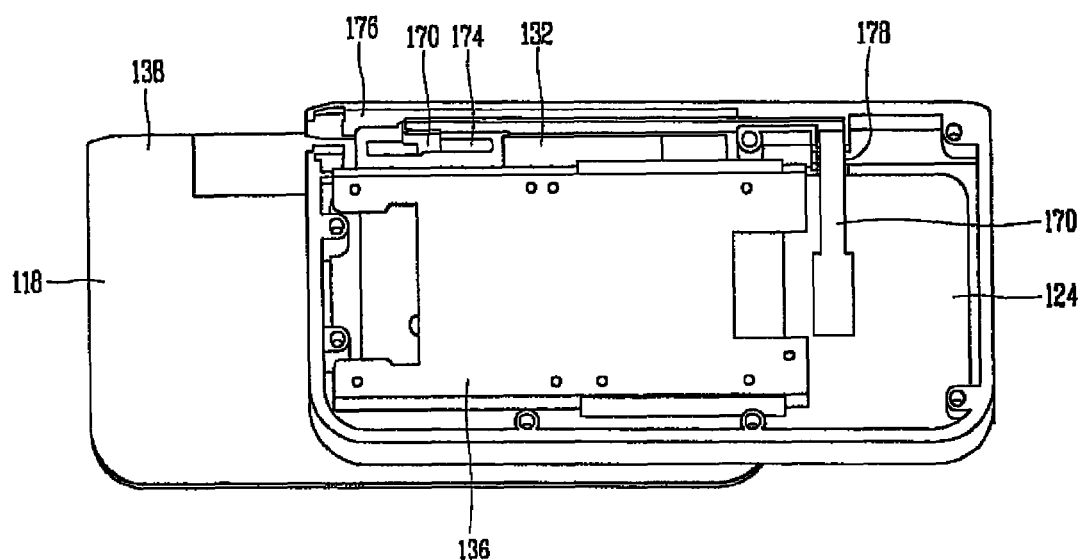
FIGS. 10 and 11 are front views illustrating operational states of the FPC connection structure of FIG. 9.
Figure 11:
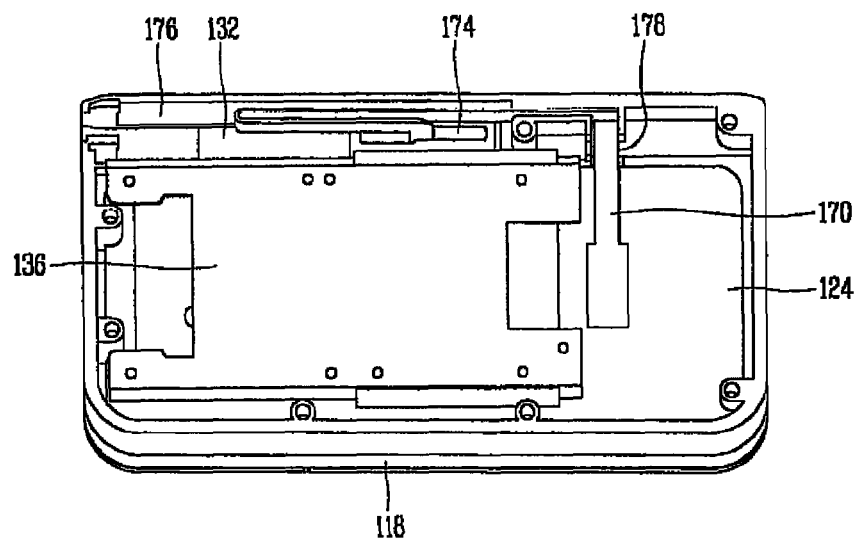

FIG. 9 illustrates an FPC connection structure according to the present invention. FIGS. 10 and 11 illustrate operational states of the FPC connection structure according to the present invention.

An FPC 170 is provided between the first body 110 and second body 120 and electrically connects them. A passage 172 is formed at the hinge member 132 in a lengthwise direction and a first withdrawal hole 174 is formed at a side of the center of the hinge member. The FPC 170 passes through the passage 172 when connected to the first body 110 and is withdrawn through the first withdrawal hole 174 such that it is connected to the second body 120 after passing through the passage.

A receiving portion 176 is formed at a side of the upper body 124 of the second body 120 in a lengthwise direction. The FPC 170 is received in the receiving portion 176 in an overlap state after passing through the first withdrawal hole 174.

A second withdrawal hole 178 is formed at one side of the receiving portion 176. The FPC 170, which has been received in the receiving portion 176, is withdrawn through the second withdrawal hole 178 such that it is connected with the second body 120.

Because the FPC 170 is disposed in an overlap state in the receiving portion 176, the FPC is unfolded so as to not interfere with the slidable movement of the first body 110 when the first body is slidably moved. With one end connected with to first body 110, the FPC 170 passes through the passage 172 and is withdrawn through the first withdrawal hole 174, received in the overlap state in the receiving portion 176, withdrawn through the second withdrawal hole 178, and is then connected to the second body 120.

The operation of the slide module according to the present invention will now be described in detail.

When the mobile terminal 100 is used in a communication mode and when the first body 110 is pushed in the lengthwise direction, the slide member 134 connected to the first body by the hinge member 132 is slidably moved along the slide rail 136 fixed to the second body 120 to guide slidable movement of the first body. The elastic force providing unit installed between the slide member 134 and the slide rail 136 provides an elastic force to the first body 110, thereby causing the first body to open automatically. When the first body 110 is slidably moved, the FPC 170 received in the overlap state in the receiving portion 176 formed at the second body 120 is moved together without interfering with the movement of the first body 110.

When the mobile terminal 100 is used in a game mode or a video viewing mode and the first body 110 is rotated, the hinge connection part 138 formed at the first body is rotated about the hinge member 132 fixed at the slide member 134 mounted on the second body 120 to guide rotation of the first body. When the first body 110 is rotated, the cam member 142 mounted between the hinge connection part 138 and the hinge member 132 provides an elastic force in the opening direction, thereby causing the first body 110 to open automatically. The cam member 142 also provides the same elastic force to the first body 110 when the first body is closed.

The mobile terminal according to the present invention is constructed such that a hinge member is rotatably connected to a first body, a slide rail is mounted on a second body, the hinge member is fixed at a slide member and the slide member is slidably mounted on the slide rail. With this structure, when the terminal is used in a call mode, the first body is slidably moved and when the terminal is used in the video viewing mode or a game mode, the first body can be folded or unfolded, thereby satisfying various functions.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:
1. A mobile terminal comprising:
a first body;
a second body comprising a keypad on a front side; and
a connecting mechanism configured to operatively connect the first body and second body, to position the first body and the second body in a closed state such that the keypad is covered by the first body, and to position the first body and the second body in a first open state or a second open state, wherein rotation of the first body with respect to the second body from the closed state positions the first body and the second body in the first open state, wherein a sliding motion of the first body with respect to the second body from the closed state positions the first body and the second body in the second open state, wherein the connecting mechanism comprises:
a hinge connection part formed on a side portion of the first body,
a hinge member hingedly coupled with the hinge connection part,
a slide member having a flat plate form, elongated from the hinge member, and comprising at least one rail part, such that the slide member extends to an inner space of the second body to allow the first body to slide with respect to the second body when the first body and the second body are in the closed state, and
a pair of rails extending towards both ends of the second body, positioned on opposite ends of the second body and disposed below a position of the keypad, fixed to the second body, and coupled with the slide member via the at least one rail part to allow relative linear motion in reciprocal directions,
wherein the second body further comprises an opening on a side portion, and stoppers positioned at opposite end portions of the opening to catch the slide member in the closed state and the second open state, and
wherein the hinge member is disposed adjacent to only one of the pair of rails.

2. The terminal of claim 1, wherein the first body comprises a first display located on a front surface, a second display mounted on a rear surface, and a pair of speakers mounted on opposite sides of the rear surface.

3. The terminal of claim 1 wherein the hinge member comprises a bar type having two ends, and wherein each of the two ends is rotatably mounted to the hinge connection part.

4. The terminal of claim 3, further comprising a flexible printer circuit (FPC) connected to the first body, wherein the hinge member comprises a passage formed in a lengthwise direction and adapted to allow the FPC to pass through the passage.

5. The terminal of claim 4, wherein the hinge member further comprises a withdrawal hole adapted to allow the FPC to pass through the withdrawal hole such that the FPC is connected to the second body.

6. The terminal of claim 1, further comprising:
a buffer member installed on an upper surface of the second body, the buffer member being structured and positioned to reduce an impact when the first body is folded and to guide the first body when the first body is slidably moved.

7. The terminal of claim 6, wherein the buffer member protrudes in a lengthwise direction of the second body on the upper surface of the second body.

8. A mobile terminal comprising:
a first body comprising a hinge connection part;
a second body comprising a keypad on a front side; and
a slide module mounted between the first body and second body and configured to enable the first body to slidably move in a first direction and to fold in a second direction, the slide module further configured to place the first body in a closed state such that the keypad covers the first body, a first open state via a rotation motion with respect to the second body from the closed state, and a second open state via a sliding motion with respect to the second body from the closed state, wherein the slide module comprises:
a hinge member hingedly coupled with the hinge connection part,
a pair of slide rails spaced apart by a distance and coupled, coupled to the second body, extending towards opposite ends of the second body, and disposed below a position of the keypad and at opposite sides of the second body, wherein the slide rails are located in an inner space of the second body, and
a slide member having a flat plate form, extending from the hinge member to the inner space of the second body and comprising at least one rail part, wherein the slide member is slidably coupled to the slide rail, such that the slide member allows the first body to slide with respect to the second body when the first body and the second body are in the closed state,
wherein the second body further comprises an opening on a side portion thereof, and stoppers located at opposite end portions of the opening to catch the slide member in the closed state and the second open state, and
wherein the hinge member is disposed adjacent to only one of the pair of slide rails.

9. The terminal of claim 8, wherein the slide member reciprocally slides in a space formed at a side surface of the second body.

10. The terminal of claim 8, wherein the second body comprises an upper body and a lower body coupled to each other, and the slide rails are fixed between the upper body and the lower body.

11. The terminal of claim 10, wherein the slide member reciprocally slides in a space between the upper body and the lower body.

12. A mobile terminal comprising:
a first body;
a second body having a keypad on a front side; and
a connecting mechanism configured to operatively connect the first body and second body to position the first body and the second body in a closed state such that the keypad is covered by the first body, and to position the first body and the second body in a first open state or a second open state,
wherein the rotation of the first body with respect to the second body from the closed state positions the first body and the second body in the first open state,
wherein a sliding motion of the first body with respect to the second body from the closed state positions the first body and the second body in the second open state,
wherein the connecting mechanism comprises:
a hinge connection part formed on a side portion of the first body;
a hinge member hingedly coupled with the hinge connection part;
a slide member having a plate form, elongated from the hinge member, and extended to an inner space of the second body to allow the first body to slide with respect to the second body when the first body and the second body are in the closed state, and
at least two rails fixed to the second body, disposed below a position of the keypad, and coupled with the slide member to allow relative linear motion in reciprocal directions, and
wherein the second body comprises an opening on a side portion thereof, and stoppers positioned at opposite end portions of the opening to catch the slide member in the closed state and the second open state;

wherein the hinge member is disposed adjacent to only one of the at least two rails and comprises a bar type having two ends, each end rotatably mounted to the hinge connection part, wherein the mobile terminal further comprises a flexible printer circuit (FPC) connected to the first body and, wherein the hinge member comprises a passage formed in a lengthwise direction and adapted to allow the FPC to pass through the passage;

wherein the hinge member further comprises a withdrawal hole adapted to allow the FPC to pass through the withdrawal hole such that the FPC is connected to the second body; and wherein the second body further comprises a flexible printed circuit (FPC) receiving part formed in a lengthwise direction at its side, the FPC receiving part adapted to receive the FPC in an overlap state after the FPC passes through the withdrawal hole.

13. The terminal of claim 12, further comprising a cam unit mounted between the hinge member and the first body, the cam unit adapted to provide an elastic force in a rotational direction of the first body.

14. The terminal of claim 12, wherein the cam unit comprises:

a housing fixed within the hinge member;

a first cam having a first cam face and mounted to be linearly movable within the housing;

a second cam rotatably disposed within the housing and having a second cam face adapted to contact the first cam face;

a head connected to the second cam and fixed to the first body; and a spring disposed within the housing and adapted to provide an elastic force to the first cam.

15. A mobile terminal comprising:

a first body having a first speaker, a first display and a first keypad on a front side, and further having a second display and a pair of speakers on a rear side; a second body having a second keypad on a front side; and a connecting mechanism configured to operatively connect the first body and second body to position the first body and the second body in a closed state such that the first speaker, the first display and the first keypad are exposed and the second keypad is covered by the first body, and to position the first body and the second body in a first open state or a second open state, wherein the rotation of the first body with respect to the second body from the closed state positions the first body and the second body in the first open state, wherein a sliding motion of the first body with respect to the second body from the closed state positions the first body and the second body in the second open state, wherein the connecting mechanism comprises:

a hinge connection part formed on a side portion of the first body;

a hinge member hingedly coupled with the hinge connection part;

a slide member having a flat plate form, comprising at least one slide part, elongated from the hinge member and extended to an inner space of the second body to allow the first body to slide with respect to the second body when the first body and the second body are in the closed state, and at least two rails fixed to the second body, disposed below a position of the second keypad, and coupled with the slide member via the at least one slide part to allow relative linear motion in reciprocal directions, wherein the second body comprises an opening on a side portion thereof, and stoppers positioned at opposite end portions of the opening to catch the slide member in the closed state and the second open statue, and wherein the hinge member is disposed adjacent to only one of the at least two rails.

* * * * *